United States Patent
Mills et al.

(10) Patent No.: US 7,636,683 B1
(45) Date of Patent: Dec. 22, 2009

(54) COMMUNICATION OF CREDIT FILTERED PRICES IN AN ELECTRONIC BROKERAGE SYSTEM

(75) Inventors: Gregory D. Mills, Florham Park, NJ (US); Neena Jain, South Plainfield, NJ (US); Edward R. Howorka, Morris Plains, NJ (US)

(73) Assignee: EBS Group Limited (GB)

( * ) Notice: Subject to any disclaimer, the term of this patent is extended or adjusted under 35 U.S.C. 154(b) by 0 days.

(21) Appl. No.: 09/786,736

(22) PCT Filed: Sep. 11, 1998

(86) PCT No.: PCT/US98/19196

§ 371 (c)(1),
(2), (4) Date: Jun. 18, 2001

(87) PCT Pub. No.: WO00/16224

PCT Pub. Date: Mar. 23, 2000

(51) Int. Cl.
*G06Q 40/00* (2006.01)
(52) U.S. Cl. .......................... 705/37; 705/44
(58) Field of Classification Search ............. 705/10–44
See application file for complete search history.

(56) References Cited

U.S. PATENT DOCUMENTS

| | | | |
|---|---|---|---|
| 5,375,055 A | 12/1994 | Togher et al. | |
| 5,924,083 A * | 7/1999 | Silverman et al. | ............. 705/37 |
| 6,014,627 A | 1/2000 | Togher et al. | |

FOREIGN PATENT DOCUMENTS

| | | |
|---|---|---|
| EP | 0512702 | 11/1992 |
| WO | 96/05563 | 2/1996 |
| WO | 99/19821 | 4/1999 |

* cited by examiner

*Primary Examiner*—Frantzy Poinvil
(74) *Attorney, Agent, or Firm*—Dickstein, Shapiro, LLP.

(57) ABSTRACT

Computerized trading system for trading financial instruments having a communication network connecting traders dealing in financial instruments and a plurality of trader terminals connected to the communication network. The communication network comprises a credit store for storing an indication of credit available from each credit granting entity, a price distributor for distributing the price quotation messages to trader terminal for display, a credit filter to filter the price quotation messages to each trader terminal associated with at least one credit granting entity.

29 Claims, 8 Drawing Sheets

FIG. 1

| FROM \ TO | TFA1 | TFA2 | TFB1 | TFB2 |
|---|---|---|---|---|
| TFA1 | 0 | 1 | 0 | 1 |
| TFA2 | 1 | 1 | 0 | 1 |
| TFB1 | 0 | 1 | / | / |
| TFB2 | 1 | 0 | / | / |

FIG. 6

COMMUNICATION OF CREDIT FILTERED PRICES IN AN ELECTRONIC BROKERAGE SYSTEM

TECHNICAL FIELD

The present invention relates generally to an electronic brokerage system having a communication network connecting traders dealing in financial instruments, and more particularly to a computerised system for trading derivatives such as forward rate agreements.

U.S. Pat. No. 5,375,055 discloses an automated matching system for anonymous trading of foreign currencies in which traders may enter bids and offers through trader workstations into a distributed matching system. Credit limits, set by the potential parties to a transaction, are stored at Market Access Nodes to which the workstations are connected. The credit limits are analysed as part of the deal completion procedure, and deals which would exceed the credit limits are inhibited. The Market Access Nodes are linked to one or more Arbitrators and to one or more Market Distributors. The Market Distributors' function is to distribute prices of open bids and offers using Pre-Authorisation Matrix derived from credit limits stored at the Market Access Nodes. The Arbitrators handle deal matching and resolve possible contentions in trades which could otherwise occur because of the distributed nature of the system, preferably using a similar Pre-Authorisation Matrix. The Pre-Authorisation Matrix is used to inhibit trades between incompatible counterparties and also to screen bids/offers prior to display so that bids/offers shown to a trader are "dealable", that is there is credit available to the trader to at least partially deal the displayed quote. An improved version of this system is also known and implemented as the EBS system for dealing foreign exchange.

Thus, this known prior art trading system provides an individual trader with a way to determine, prior to committing to buy or sell at a displayed price from one or more anonymous counter parties, whether he has credit with the anonymous counterparty offering (bidding) a particular price currently displayed on his screen and thus whether any attempt to buy or sell at the displayed price will be subsequently invalidated by the system for lack of such credit.

We have appreciated, however, that whilst such a system has the benefit that only available prices are displayed, the credit considerations do not allow trading of certain products, such as futures. We have appreciated that there are further technical considerations in providing a system which can determine a measure of credit for futures which, by definition, do not have a fixed credit liability.

SUMMARY OF THE INVENTION

Accordingly, there is provided a computerised trading system for trading financial instruments between traders at trader terminals, comprising:

a communication network for transmitting electronic messages between the trader terminals, a plurality of trader terminals connected to the communication network, each trader terminal being associated with a credit granting entity, and each trader terminal comprising means for generating price quotation messages in respect of financial instruments, the communication network comprising a credit store for storing an indication of credit available from each credit granting entity.

a price distributor for distributing the price quotation messages to trader terminals for display, a credit filter arranged to filter the price quotation messages to each trader terminal associated with at least one credit granting entity, wherein the credit filter is so arranged that only the prices indicated by price quotation messages for which it is determined with reference to the credit store that a minimum credit threshold is available on a bilateral basis from and to the one credit granting entity are displayed at the trader terminals associated therewith, the minimum credit threshold being at least equal to the available credit required by the one credit granting entity to complete a trade of a predetermined minimum size, wherein a separate minimum credit threshold is established for each credit granting entity and is derived from a function of at least one parameter specific to each credit granting entity and related to the nature of at least one financial instrument being traded.

The system of the invention thus provides the advantage that each credit-granting entity has the ability to set its own minimum credit threshold. In a system embodying the invention, a trading floor administrator (TFA) may thus select an appropriate threshold based on parameters of the TFA's selection. This gives a degree of control not provided in the prior art noted above allowing a system embodying the invention to trade more types of financial instrument, including forward rate agreements (FRAs).

In an embodiment of the invention, the at least one parameter is a factor indicative of an estimated risk associated with each financial instrument traded. This allows a trading floor administrator to limit the exposure of trades occurring on the trading floor under his/her supervision. The at least one parameter is preferably a volatility factor for each type of financial instrument traded. The TFA can thus use the volatility factor to ensure that an appropriate measure of risk is associated with each financial instrument. For example, financial instruments traded in one currency may be considered to be a higher risk than other currencies.

In an embodiment, other factors may be included in the credit threshold calculation, such as a conversion rate and/or a factor based on the time to settlement of a financial instrument traded. Preferably, the factor based on the longest time to settlement is used. This allows the TFA to ensure that the prices are screened according to an appropriate measure of credit exposure.

The minimum credit threshold is preferably the maximum value of a function of a minimum order size, a conversion rate, a time to settlement factor and a volatility factor of all financial instruments traded. This ensures that all financial instruments for a predetermined minimum size deal will be displayed, provided that there is sufficient credit for that minimum size deal in the financial instrument with greatest credit exposure being traded.

In an embodiment, a plurality of trader terminals are preferably associated with at least one group to which the at least one credit granting entity extends credit. The group may comprise a plurality of trader terminals associated with a single trading floor/credit granting entity or with a plurality of trading floors/credit granting entities. The TFA may thus select appropriate groups of trading floors so that credit is extended to a group as a whole. Any one trading floor within the group may participate in the credit limit extended.

The indication of credit available from each credit granting entity to each group is preferably decremented after each trade between those groups, particularly by an amount derived as a function of the deal size and at least one parameter associated with each credit granting entity, such as a volatility factor, conversion rate, or a factor based on the time to settlement of the financial instrument traded.

The system thus uses factors both for credit screening of prices, and for calculating the credit utilisation of financial instruments.

Thus, each bid or offer is prescreened by the system for bilateral credit with each potential counterparty, before calculating an anonymous "Dealable" price for presentation to any of the traders dealing with that particular financial instrument. The system includes the facility to derive an appropriate credit measure for futures.

In embodiment described later, the sensitive credit limit data indicating how much credit a particular client site is willing to extend to each possible counterparty is maintained only at a Market Access Node associated only with that particular client, and only a simple yes/no indication of whether the entity (for example, a trader, a trading floor, or a bank) associated with that particular access node is willing to transact business with a particular counterparty is transmitted to the other nodes of the communication network. In that embodiment, the pre-screening may thus be a simple check to determine whether any credit remains both from and to each of the two parties to the potential transaction which may be performed using a simple yes/no Pre-Authorisation Matrix before any bid or offer is transmitted to a particular client site.

Such Pre-Authorisation Matrices are preferably maintained at each of several regional nodes ("Market Distributors") of a distributed processing communication network, with each such Market Distributor node functioning as a price distributor and being connected by corresponding individual permanent links of the network to those client sites ("Market Access Nodes") for which it is responsible for distributing market information including customised "Dealable" bid and offer prices in addition to global "Best" prices. To further limit the data received and processed by each relevant regional node computer, (ie, the Market Distributor node closest to the particular Market Access Node associated with a particular counterparty), only changes in the credit state (ie, credit is no longer available or credit is now available from party A to party B) are transmitted, and even those changes are not transmitted to Market Distributors associated with neither of those parties.

It should be noted that the embodiment described later will be one in which the functions of the network are distributed throughout a variety of components. This is considered to be the most effective manner of implementing the system. However, it will be appreciated that it would be a simple task to incorporate this functionality into a system with a single location for these functions.

BRIEF DESCRIPTION OF THE DRAWINGS

An embodiment of the invention will be described by way of example only and with reference to the accompanying figures in which:

FIG. 1 depicts an overview of the trader's trading screen;

FIG. 6 depicts a Pre-Authorisation Matrix;

DETAILED DESCRIPTION OF THE PREFERRED EMBODIMENT

Overview

Figure 2:
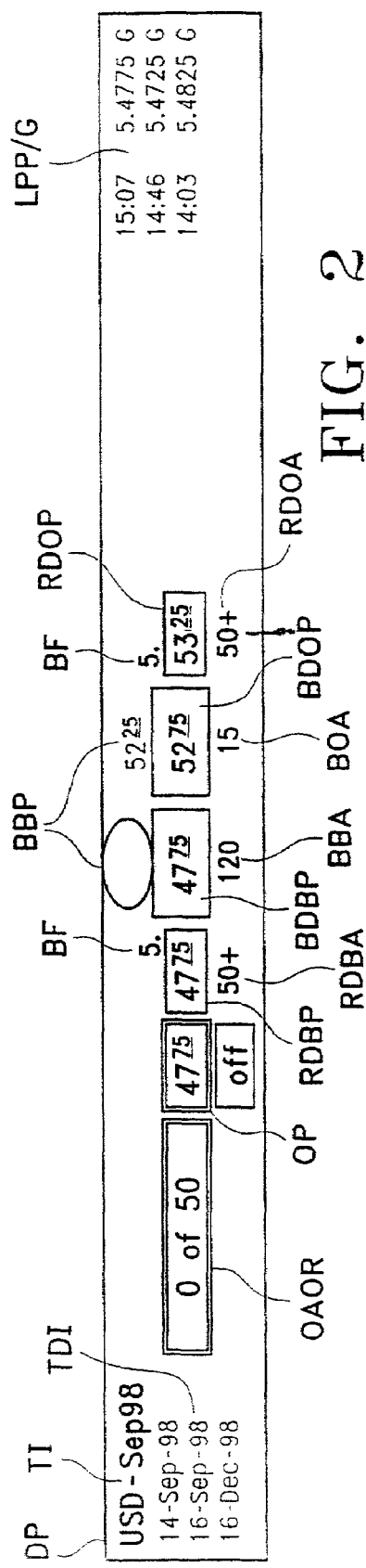
FIG. 2 shows a Tenor Detail Panel for the trader's screen shown in FIG. 1.

A Forward Rate Agreement (FRA) is a contract between two parties to lock in a forward interest rate, for a period, starting at a specific date in the future. Each FRA contract can be categorised as a spot FRA, an IMM FRA, or a broken date FRA. All these may be traded on the system of the present embodiment. IMM is the abbreviation which has become customary to refer to an instrument traded on one of the International Monetary Market dates. In brief, IMM FRAs are traded for the four International Monetary Market (IMM) dates. Spot FRAs are traded for dates associated with today's spot date. A broken date FRA is a spot FRA which is traded for a different spot date than today's spot date.

Figure 1:
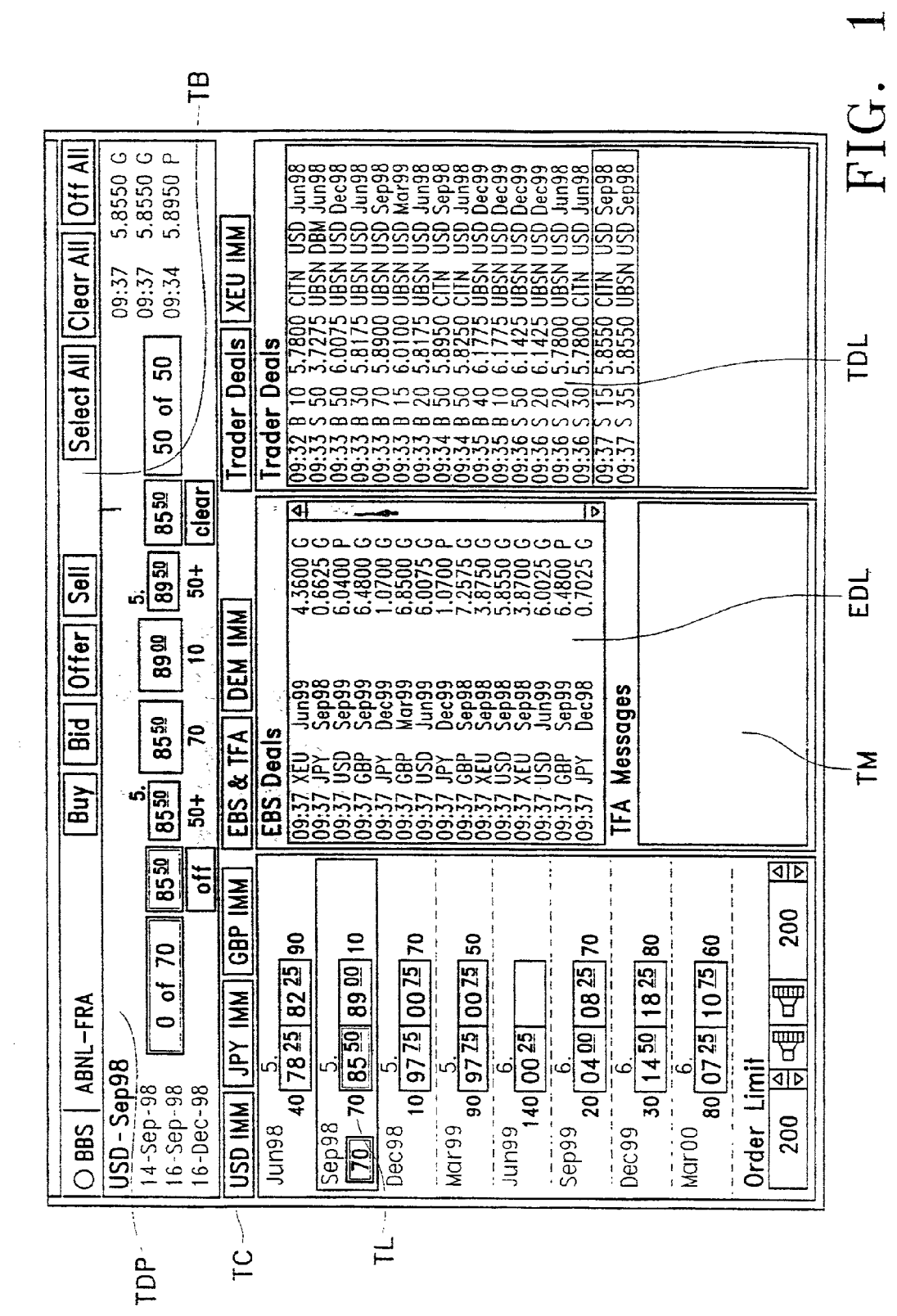

A FRA trading screen of a system embodying the invention is shown in FIG. 1. The FRA trading workstation presents a set of FRA contracts that may be traded in an electronically brokered format. Each type of contract is known as a tenor. Price information for a particular tenor is displayed on a tenor line. For each tenor line, the dealing system presents the best credit-screened bid and offer prices of all active quotes. Upon selection of the tenor line, the workstation presents a detailed view of the associated tenor showing contract dates and additional market view information.

A trader may select a tenor line and then submit one of four order types (Bid, Offer, Buy, or Sell). Each type of order requires the trader to specify an interest rate notional amount for a particular tenor. Once submitted, new orders are matched with outstanding orders in price/time priority. Compatible orders are matched resulting in the execution of deals. In order to encourage market making a trader can submit and adjust bids and offers for several tenors at a time.

For non-standard FRAs, a price inquiry function allows the trader to issue a system-wide broadcast to request a price for a broken date FRA. A trader may respond to a price inquiry by selecting the entry in the bulletin board.

The credit facility uses pre-screened prices. Trading Floor Administrators (TFAs) at the trading floors enter credit limits for each counterparty group of trading floors. Dealable prices are distributed to those floors that have credit with the price maker.

The trading screen shown in FIG. 1 provides traders with the facility to enter bids, offers, buy or sell orders by selecting buttons on a toolbar at the top of the screen. The best bid/offer prices are displayed for tenors of various lines in one window and deals done by the trader and on the system as a whole are displayed in other windows. The display is better understood with reference to an example of a FRA deal.

As explained, a Forward Rate Agreement (FRA) is a contract between two parties to lock in a forward interest rate, for a period, starting at a specific date in the future.

For example, a 6×9 FRA is a contract covering a period that begins 6 months from now and ends 9 months from now. The term or gap of such a contract is 3 months. The two counterparties, one buyer and one seller, settle by cash payment at the start of the contract (in this case 6 months from now).

The buyer of a FRA will be compensated if future interest rates rise. The seller of an FRA will be compensated if future interest rates fall.

Settlement is based on the difference between the actual interest rate prevailing on the fixing date and the rate specified in the contract, for a specific notional amount stated in the contract. Settlement takes place at the beginning of the term.

As an example, consider a USD 6×9 FRA trade for $100 million (U.S.) at an agreed upon rate of 5.5675 executed on Sep. 9, 1997 The deal has the following characteristics:

Trade Date: Sep. 9, 1997
Spot Date: Sep. 11, 1997
Fixing Date: Mar. 9, 1998
Settlement Date: Mar. 11, 1998
Maturity Date: Jun. 11, 1998
Contract Rate: 5.5675
Notional Amount: 100 million (U.S.$)
Reference Rate: LIBOR The period of this deal begins on Mar. 11, 1998 (the settlement date) and ends on Jun. 11, 1998 (the maturity date). On March $9^{th}$, sometime after 11:30 AM London time, the back office personnel at each bank will look on the appropriate Reuters page to read the 3-month LIBOR rate posted for March $9^{th}$. If, for example, this rate is 5.5800, then between the trade date and the fixing date, the interest rate has risen 0.0125 percent or 1¼ basis points. Therefore, a settlement amount must be calculated based on this reference rate of 5.58%. The settlement amount is the amount on the check paid by the seller to the buyer. The settlement amount is calculated using the following formula:

Settlement Amount Calculation Example $$\frac{(\text{Fixing Rate} - \text{Contract Rate}) \times (\text{Days in Period}) \times (\text{Notional Amount})}{(360 \times 100) + (\text{Fixing Rate} \times 100 \times (\text{Days in Period}))}$$

$$\frac{(5.58 - 5.5675) \times (92) \times (100,000,000)}{(360 \times 100) + (5.58 \times 100 \times (92))}$$

$$\frac{115,000.000}{87,336}$$

$$\$1,316.76$$

Note that if interest rates had fallen, then the buyer of the FRA must pay the seller.

FRAs serve as both a hedging and a speculative instrument. A bank may use an FRA to hedge against future inflows and outflows of cash on its balance sheet, or a bank may use an FRA to speculate in the future movement of interest rates. By definition, an FRA trades over-the-counter. The resultant contract is between two parties and is therefore dissimilar to a futures contract which is traded via an exchange.

FRAs for EBS can be split into the following categories:
IMM FRAs
Spot FRAs
Broken Date FRAs The present embodiment is described in relation to IMM FRAs; that is FRAs which are based on the International Monetary Market dates.

FRAs are distinguished by the dates of the contract, the reference rate, and the contract currency. Each type of FRA contract is called a tenor. Some example tenors are listed below:

| Examples of FRA Tenors: | | |
| --- | --- | --- |
| Cash 3 month | Cash 6 month | Cash 12 month |
| USD 1x4 | DEM 1x7 | USD 1x13 |
| USD 3x6 | USD 2x8 | DEM 2x14 |
| JPY 6x9 | JPY 6x12 | USD 12x24 |
| IMM FRAs | IMM FRAS with a 6 month gap | Broken Date FRAs |
| USD September 1997 | USD June 1997-6 | USD 3x6(12) |
| USD December 1997 | USD September 1998-6 | DEM 2x14(10) |
| JPY March 1998 | JPY September 1998-6 | USD 0x3(3) |

If the tenor is selected with a mouse or keypad, then the details of the FRA tenor line are presented in the top section of the screen. The detail area shows the best dealable, EBS best, and best regular prices for the selected tenor. The fixing date, settlement date, and maturity date of the active tenor are shown as well.

Turning again to FIG. 1, the screen can now be better understood. The Tenor Detail Panel provides a detailed view of tenor line information and transaction activity. The Tab Controls allow a user to select one of several user-defined tab sheets. The user may designate the tab sheet properties and components. The Tenor Line shows a tenor indicator, best bid and offer prices, best amount available for bid and offer and a big figure. The TFA Messages area shows messages relating to Trading Floor Administration, such as credit notifications, deal recovery, help desk message broadcasts. The EBS Deals Listbox shows deals completed on the EBS system. The Trade Deals Listbox shows deals completed by the trader using the screen, and the Toolbar allows the trader to select common trading commands.

A number of tenor lines (more than fifty) may be visible on the screen concurrently. There may be additional tenor lines that are not visible on the screen due to space constraints, but can be easily brought into view. The screen also allows the trader to elect to show fewer tenors (as few as eight) depending upon the trader's preference.

The Tenor Detail Panel is shown in FIG. 2 and shows a selected Tenor Line in more detail. It includes:

Tenor Identification (currency and description)

Tenor Date Information (Fixing Date, Settlement Date, and Maturity Date)

Regular Dealable Bid and Offer Prices for "regular" amounts satisfying credit screening (A "regular" amount is an amount at least equal to a system default value representative of a typical trade in a particular currency, and may for example be 50 M pounds)

Best Dealable Bid and Offer Prices (the best price available after credit screening for any amount) along with the total quantity ("Best Bid and Offer Amounts") available at those prices.

EBS Best Bid and Offer Prices (the best price available on the whole system regardless of credit (though this may not be available to the trader) if this different from the corresponding Best Dealable Prices.

Note that much of this information is also shown in each Tenor Line of each Tab Sheet (FIG. 1).

To the left of FIG. 2 is a bid/buy Order Status indicator showing the amount requested and obtained for an open Order. If a Offer/Sell Order was pending, its status would be displayed on the right.

Note that the bid (buy) prices are on the left, and the offer (sell) prices are on the right, and that all displayed prices are arranged in ascending order from left to right. The EBS Best Bid Price (if shown) will always be better than the Best Dealable Bid Price. This is because the credit granting entity for this trading floor may not have extended sufficient credit to the counterparty offering the Best Bid Price (or vice versa). Similarly, the Best Dealable Bid Price will always be at least as good as the Regular Dealable Bid Price. In the particular example shown in FIG. 2, the Best Dealable Bid Amount is 120 which is larger than the "Regular" amount of 50, and consequently the same price (5.4775) is shown as the Regular Dealable Bid Price and the Best Dealable Bid Price.

Figure 3:
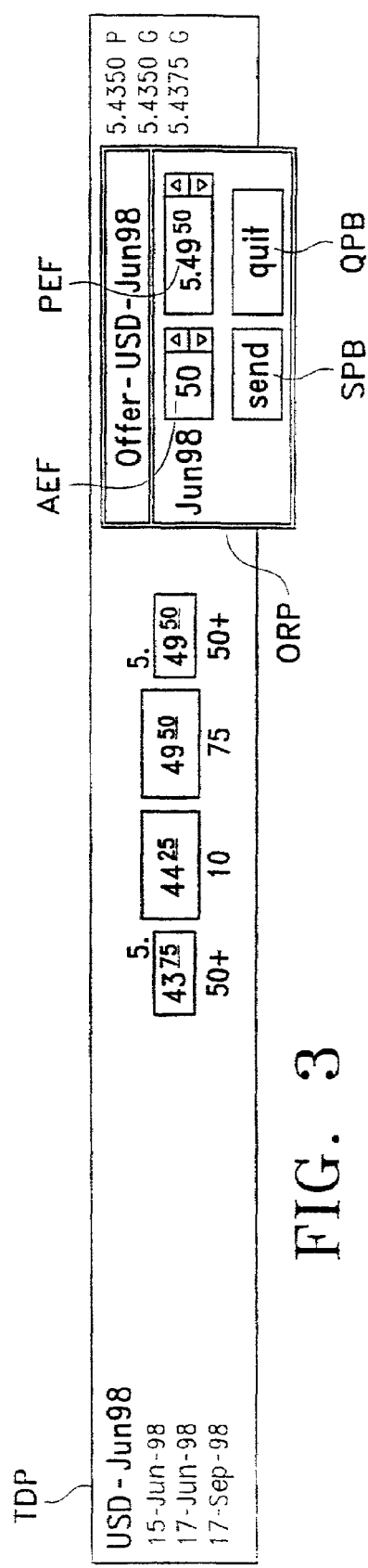
FIG. 3 shows Order Request Panel for the trader's screen shown in FIG. 1.

FIG. 3 shows the Offer Order Request Panel which appears on the right side of the Tenor Detail Panel when a particular Tenor has been selected and either the Offer or Sell key has been activated. (A similar Bid Order Request Panel appears on the left side of the Tenor Detail Panel when a particular Tenor has been selected and either the Bid or Buy key has been activated.) The Order Request Panel includes an Amount Entry Field and a Price Entry Field, both of which include up and down spin buttons for adjusting the respect entries up or down, as well as a Send Pushbutton for submitting the order (assuming appropriate validation checks are positive) and a Quit Pushbutton which dismisses the Order Request Panel without any action being taken. As previously indicated with respect to FIGS. 1 and 2, once a valid order has been submitted, its status is displayed on both the Tenor Detail Panel (FIG. 3) and in the corresponding Tenor Line (FIG. 2), with the latter showing only the Amount Remaining in the outstanding order (ie, the difference between the Amount Requested and the Amount Obtained shown in the Tenor Detail Panel).

Figure 4:
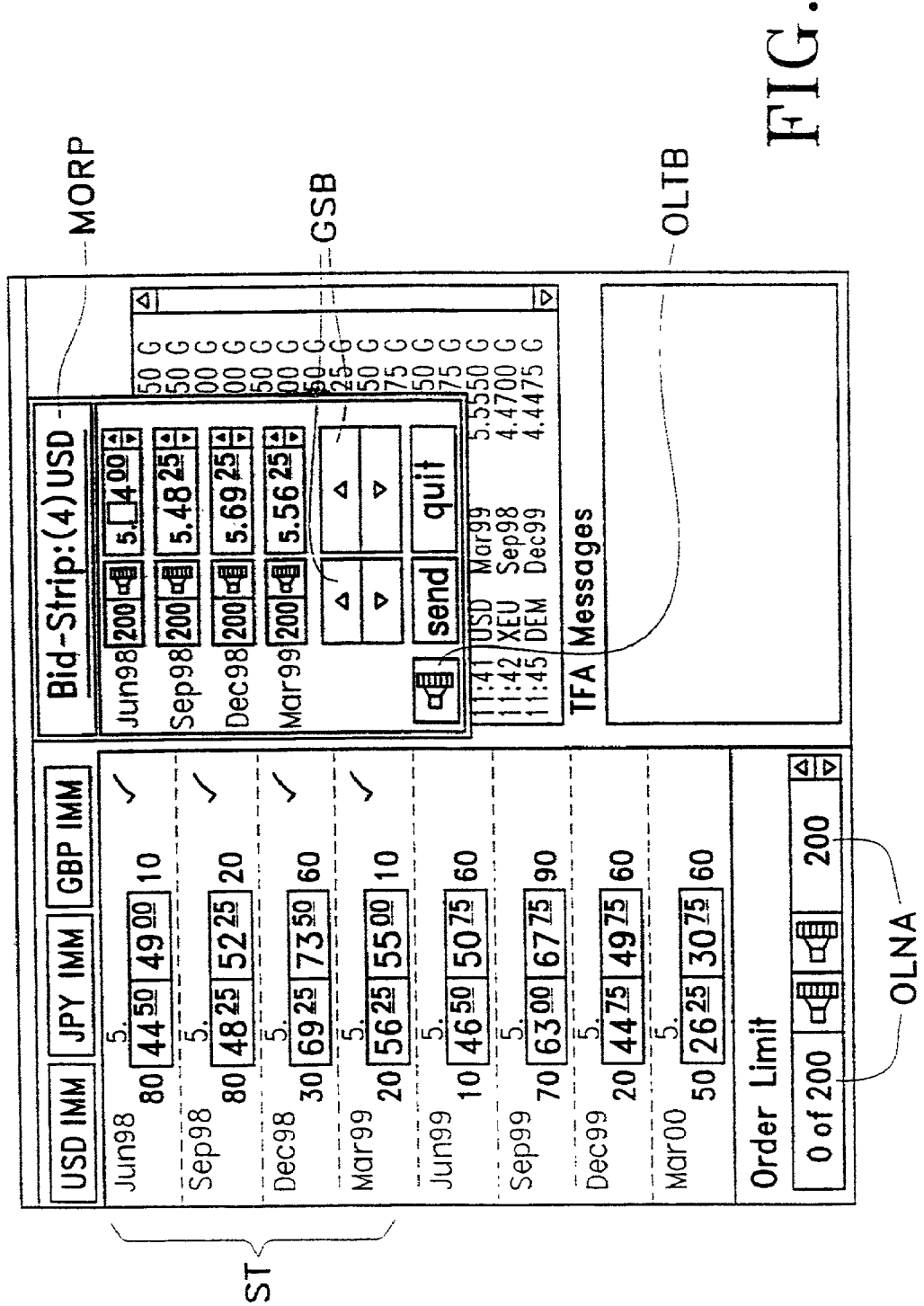
FIG. 4 shows a Multiple Order Request Panel for the trader's screen shown in FIG. 1.

Additionally, as shown in FIGS. 1 and 4, the trading workstation provides many features for managing multiple orders as a group. A group of orders may be selected using a mouse—then these orders may be interrupted (Tool Bar of FIG. 1), or modified and re-submitted as a group (using the Multiple-Order Request Panel of FIG. 4). In this way, the trader is able to adjust a strip of outstanding orders as easily as adjusting a single order. Note that an optional Order Limit is applicable to Multiple Orders involving different Tenors for the same Currency, with a separate Order Limit Notional Amount being established for Bids and Offers.

The system of the present invention is applicable to trading various types of derivatives contracts but will be described in relation to Forward Rate Agreements (FRA) for which the described embodiment has been especially adapted.

Components in the System of the Present Embodiment

In the described embodiment, the trading system is an electronic brokerage system having a communication network for facilitating the buying and selling of futures by traders each associated with his own Workstation ("WS") located at a trading floor of a subscriber bank ("client site"). The hardware used in the system has similarities to the current EBS system for foreign exchange to which reference may be made.

Figure 5:
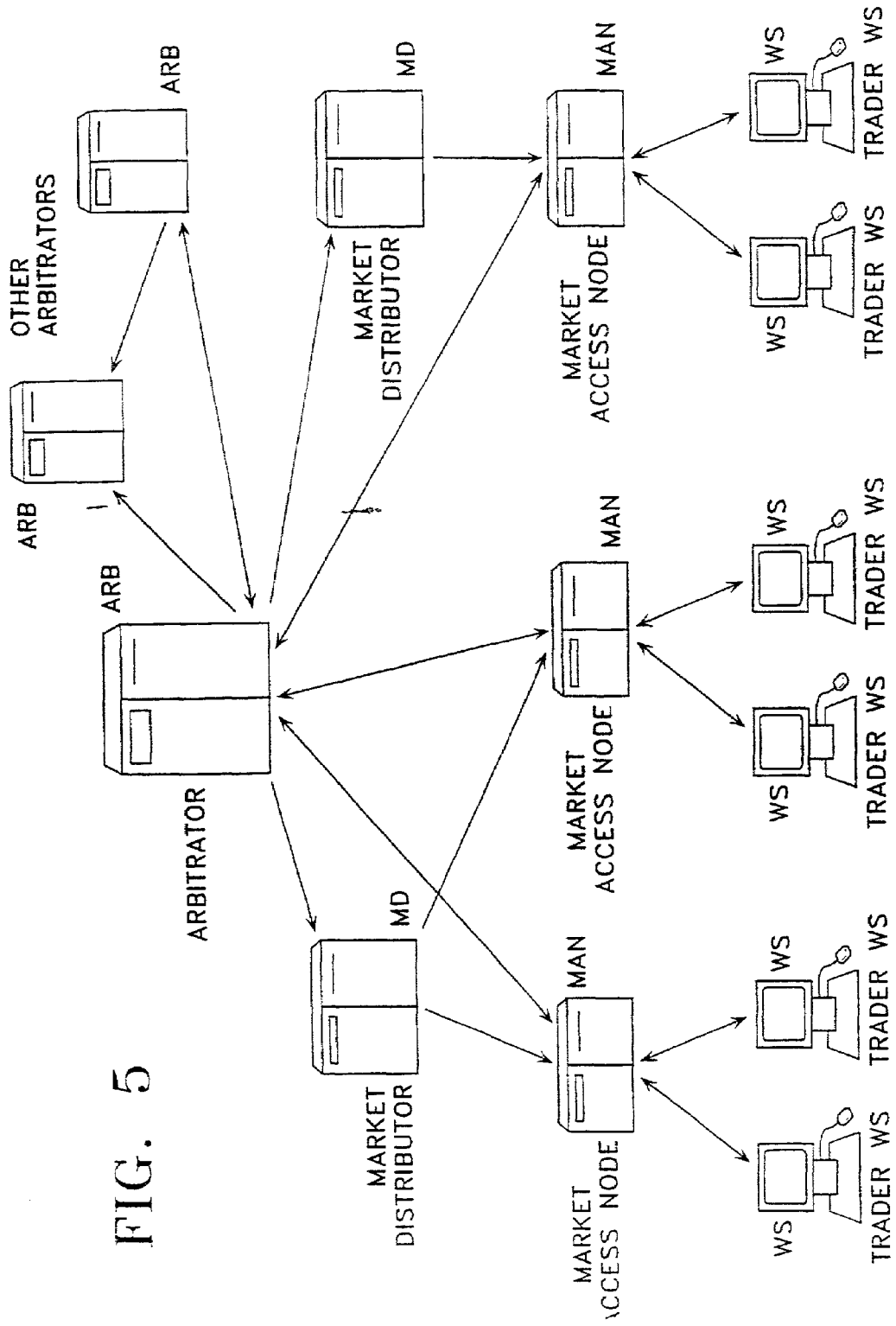
FIG. 5 is an overview of the Communication Network and the various workstations and processing nodes associated therewith.

As shown in FIG. 5, each client site has a dedicated client computer ("Market Access Node", or "MAN") under the control of a Floor Administrator, which maintains transaction records, credit limits, and other confidential information originating with its associated trading floor. The WS's and the MAN associated with each trading floor are connected via a conventional self-repairing DEC VAX network to a nearby distribution node ("Market Distributor" or "MD") computer, which typically analyses and distributes current market data by means of dedicated permanent communication links to one or more associated MAN's in a particular city (or other local region), and which may also provide administrative functions for the communication network.

The communication network comprises a credit store, stored at each MAN, for storing an indication of the credit available from the group of terminals associated with that MAN to other groups. As previously explained, a group may be one or more terminals, but is preferably one or more trading floors. The function of distributing prices is fulfilled by the Market Distributors. The Market Distributors also include a credit filter comprising a yes/no Pre-Authorisation Matrix from which it is determined whether prices should be transmitted to the trader terminals for display.

Although not considered critical to the present invention, a group of MD's is preferably supplemented by a common trading region processing node ("Arbitrator Node" or "ARB"), with the ARB performing those functions (such as identifying potential matches between buyers and sellers, and other aspects of the "Deal Matching" process that require coordination with more than one client site) which make the most efficient use of the communication network if done centrally or regionally, while the MD's perform those functions (such as generation of separate Dealable price information for each individual client site) which are readily implemented in parallel in a distributed processing network and which make most efficient use of the communication network if done locally or in close proximity to the individual client sites.

In that regard, it is possible to have more than one ARB, with each ARB having primary responsibility for trades initiated by Market Makers in the ARB's own trading region, and being connected to all the MAN's and MD's of that trading region as well as to the other ARB's in other trading regions by permanent dedicated links of the communication network. In the majority of deals, it is anticipated that both the Maker and the Taker will be within the same trading region and thus will be directly linked to the same ARB which can therefore identify a potential match and coordinate its final execution without any communication with the other ARB's; at the same time, the other ARB's can simultaneously be processing deals related to other traders in other regions. Alternatively, a single arbitrator could be dedicated to all trades involving a discrete subset of the available financial instruments. In a presently contemplated commercial embodiment, a single central Arbitrator is dedicated to FRA trades, while several regional Arbitrators are collectively dedicated to spot FX trades.

Whether the communication links between nodes are permanent (maintained indefinitely between two network components) or temporary (established dynamically for a short period of time) they are preferably "logical links" which have the property that messages sent in a certain order over the same logical link are guaranteed to reach their destination in the same order. Moreover, the communication network is preferably provided with sufficient error detection error correction, and network self-repair capability to guarantee that messages sent via these logical links are error free.

In summary, each MAN is connected to other MAN's by a robust communication network which connects the various trading floors and which supplements the MAN's with a number of processing nodes (preferably in the form of MD's and ARB's) to facilitate the distribution of price quotations and other market data and to execute transactions by matching eligible Market Makers with eligible buyers and sellers and by monitoring the transactions until they have been completed or aborted, with the MAN's being responsible for trading floor specific tasks such as logging the completed transaction and updating the credit limit that was previously available to the counterparty trading floor.

Although described above in terms of a distributed architecture, it should be noted that a single central computer system could be used to implement the various functions described above. The system of this alternative embodiment would thus comprise a plurality of workstations connected by a network to a central computer system. The central system would include the credit store, distributor and credit filter arranged to filter prices for distribution to the workstations. This is a simpler, but non-preferred, implementation. The distributed embodiment described is considered to be a more robust and secure design.

Credit Processing

The credit processing performed for interest rate futures and other derivatives in general, and FRAs in particular, differs significantly from credit processing for spot FX trading. While spot FX is concerned with settlement risk, for FRAs market risk is the primary concern. For this reason, the technical considerations in implementing the system differ.

For Forward Rate Agreements in the present embodiment, three factors are used to calculate credit utilisation;

1. The time between the trade date and the settlement date (start of the contract period), hereinafter called the TTS (Time To Settlement).
2. The volatility of interest rates in the currency of the FRA.
3. The time between the settlement date and the maturity date, ie, the gap of the FRA.

The actual liability for a FRA is not fixed at the time the price is taken because, as can be seen from the formulae above, the actual liability will depend on the difference between the interest rates at the trade and settlement dates. For this reason, a Credit Utilisation formula has been devised and implemented in the present invention. The credit utilisation is as follows:

Credit utilisation=(Deal size)×(TTS factor)×(#Months/3)×(Interest rate volatility factor)×(CCY conversion rate).

The TTS Factor is a Time to Settlement Factor assigned to every month between 0 and 24. When credit is calculated, the workstation will use the TTS Factor assigned to the TTS Month. The workstation will calculate the number of months between the Trade Date and Settlement Date to find the TTS Month. The Credit Utilisation calculation will then use the TTS Factor assigned to that month. This allows the TFA to factor into the Credit Utilisation calculation the time between the Trade and Settlement Dates.

The TTS factor is used in the credit calculation. This is a non linear calculation method for the time between trade date and settlement date. A table, initially ranging from 0-36 months, of TTS values to be used in credit utilisation formula. The factors in the table must be able to be set by the TFA. The table is to be pre-populated with factors calculated by taking the square root of the TTS. The initial values of the table for the 0 and 1 month TTS are to be 1.

| Example of pre-populated TTS table: | | | | | | | | | |
|---|---|---|---|---|---|---|---|---|---|
| TTS | 0 | 1 | 2 | 3 | 6 | 9 | 12 | 15 | 18 | 36 |
| factor | 1 | 1 | 1.414 | 1.732 | 2.449 | 3 | 3.464 | 3.872 | 4.242 | 6 |

The currency volatility parameter must be able to be entered and modified online via the TFA for each FRA currency traded on the local floor. And as previously explained, the linear calculation method for the contract period or "gap" (the "three month equivalent") is a fixed formula that can't be modified online:

3 mo. Equivalent factor=(# of mos in gap)/3.

# of Months in Gap/3—All IMM tenors have a 3 month gap between the Settlement and Maturity Dates. So this value is calculated as 3/3 or 1.

Interest Rate Volatility Factor—The IR Volatility Factor is a percent value assigned to each currency. The system will store the value as a percentage number, CCY Conversion Rate—The currency conversion rate between the Credit Limit Currency and the currency for which the deal is done.

As an example, a USD June 00 FRA Traded Jun. 16, 1998 for 100 million has the following characteristics:

Trade Date: Jun. 16, 1998
Fixing Date: Jun. 19, 2000
Settlement Date: Jun. 21, 2000
Maturity Date: Sep. 20, 2000
Tenor Cap: Jun. 21, 2000 to Sep. 20, 2000 (91 Days or 3 Month Gap)
Deal Size: $100,000,000

Factors are assigned by the TFA along with the Credit Limit Currency which is assigned on the Market Access Node. In this example, the Credit Limit Currency is USD. The factors that would be used for the above example are derived using the above table.

Using the above formulae, the credit utilisation is:

(Deal Size)×(TTS Factor)×(# of Months in Gap/3)×(Interest Rate Volatility Factor)×(CCY Conversion Rate)=Credit Utilisation (100,000,000)×(4.89898)×(3/3)×0.00014×(1.000)=$68,586=Credit Utilisation In implementing credit limits on the FRA system, the Trading Floor Administrator (TFA) has the ability to set and adjust the various parameters from which matching criteria are derived.

A credit utilisation notification is included which issues low credit warning at the trader's WS when the available credit for a counterparty falls below a percentage that is defined via the TFA. An out of credit message is also displayed at the trader's WS when credit is exhausted for a particular counterparty. Prices from that counterparty, for all tenors, will no longer be displayed. A credit utilisation report may be initiated, on demand, via the TFA for both screen and hard copy output.

Parameters used in the System

Banks initially define, and modify online, the following parameters which are stored at the local MAN for their local trading floor via the TFA facility;

a) credit limit currency—Market Access Node
b) a separate credit limit currency conversions rate parameter for each currency traded on the system
c) a parameter related to the nature of at least one financial instrument in the form of a currency volatility credit utilisation factor for each currency traded on the system. The currency volatility factor is indicative of the risk associated with each financial instrument assessed by the TFA.
d) Time to Settlement credit utilisation factors for the currencies traded on the local floor. The TTS factor is preferably non-linear and also not specific to any financial instrument traded.

Each credit group preferably comprises a plurality of trading floors. Anyone credit granting entity (which itself could be a trading floor) may trade with a trading floor of a group defined by the TFA if sufficient credit is available.

Banks also define the following for each counterparty (credit group) that they trade with which are also stored at the local MAN;
a) available credit
b) low credit warning percentage.

Banks also have the following options for resetting credit utilisation to zero:
a) Automatically at the end of the trading day, as is currently done for spot. The time of the end of the trading day for FRAs is preferably definable separately from that for FX spot.
b) On demand via the TFA
   1) for an individual credit group
   2) for all credit groups The TFA also has the ability to disallow particular floors within a credit group. If a floor is disallowed, it does not take part in the credit of that group.

To be compatible, each of the two parties must make sufficient credit available to the other party to complete a trade for at least the predetermined minimum size deal in any available currency (ie, available credit at least equal to the minimum credit threshold established by the respective credit granting entity).

The calculation is thus:

Minimum credit threshold=Maximum of {(minimum 3 month equivalent amount)×(credit TTS utilisation factor)×(# of months in gap)×(Interest rate volatility factor)×(conversion rate)} for each currency.

The TFA also has the ability to set the following parameters:
a) Notional Amount Increment The notional amount increment is a system-wide parameter (per currency) specifying the increment between notional amount values specified during order submission. All orders submitted into the system must have a notional amount that is a multiple of this value. This parameter is specified in absolute terms.
b) Price Increment The price increment specifies the granularity between prices for orders submitted into the system. The increment is defied for each tenor or tenor category defined in the database of valid FRA instruments.

The granularity of prices are defined as a global parameter for each tenor or category of tenors defined in the database of valid FRA instruments. This must be modifiable in order to change the granularity to meet the needs of the marketplace. It is expected that after introduction of EBS FRAs, the spreads will narrow in the market and we will need to reduce the price granularity accordingly.

The granularity may be designated as a decimal value representing one hundred-thousandth of a basis point. It is assumed that fractions including ½ and ¼ basis point may be designated by the decimal values 5000 and 25000. The system must be able to support granularity up to 0.03125 (equivalent to 1/32). The number of digits show in the fractions of a basis point display should also be defined for each tenor in the valid tenor database.

c) Minimum Notional Amount

The minimum notional amount is a system-wide parameter specified for each currency that specifies the minimum notional amount of an order submitted or outstanding in the system. If the remaining amount of an order falls below this value, then the remaining amount is cancelled. This value is expressed in three-month-equivalent terms.

d) Maximum Notional Amount

The maximum notional amount is a system-wide parameter (per currency) that specifies the maximum notional amount of an order submitted into the system. This value is expressed in three-month-equivalent terms.

e) Red Quote Threshold

The red quote threshold specifies a percentage of credit-compatible floors which each would at least partially hit the quote in question if it placed an order for the regular amount at the displayed regular dealable price. If that threshold percentage is met or exceeded for a particular quote, the quote in question is identified as a "Red Quote" on the maker's display. This value is a single system-wide parameter for all instruments being traded.

f) Large Difference Threshold

The large difference threshold specifies the difference (per currency) between a price entered by a trader and the current dealable price required to activate the large difference validation warning.

g) Regular Amount

The regular amount for a given tenor is used in the calculation of the regular dealable prices. This parameter is defined for each currency.

h) Wide Spread Threshold

The wide spread threshold specifies te maximum difference (per currency) in price between the trader entered price and the best dealable price on the other side of the market.

Having set these parameters, the matching process refers to these when executing matches.

Derivation of the Pre-Authorisation Matrix

The exemplary Pre-Authorisation Matrix shown in FIG. 6 is derived from the various parameters described above. In the example shown, each group comprises one trading floor.

Certain prices are said to be dealable, which means that they are prescreened for credit. A dealable prices means that sufficient bilateral credit is available with the counterparty making the price to execute at least one minimum size trade in the tenor that utilises the most credit.

The concept of dealable prices for FRAs is based on credit compatibility for all tenors. Therefore two trading floors are said to be credit compatible if they have bilaterally allocated enough credit to each other to execute one minimum size trade in the tenor that utilises the most credit available on the system.

For each FRA currency a 3 month minimum notional amount is set as a system parameter. The formula to calculate the minimum size for any tenor is;

minimum size=(3 month minimum notional amount)/(# months in gap/3)

EXAMPLE

EBS has defined the 3 month minimum notional amount=USD 50 mill

The minimum size for a USD Jun 98=(50 mill)/(3/3)=USD 50 mill

The minimum size for a USD Sep98-6=(50 mill)/(6/3)=USD 25 mill

Since credit utilisation is a function of;
1. time between trade date and settlement date (TTS)
2. time between settlement and maturity (gap)
3. the volatility of interest rates in the currency of the FRA
then for two floors to be credit compatible they must have sufficient credit available to execute a trade for a minimum size in the tenor with the highest calculated utilisation. This should mean that, subject to credit changing during deal completion, the two parties will be able to complete a deal in any currency at least of minimum size.

A trading floor can control, to an extent, the minimum credit threshold necessary to display dealable prices by modifying time to settlement factors with times to settlement that utilise the most credit. For example, a floor can specify time to settlement factors which do not increase for those factors beyond where they want to trade. Also, a floor can set the currency conversion to zero for particular currencies thus electing not to trade in volatile currencies offered on EBS, thus reducing the credit availability necessary to see prices in less volatile currencies.

EXAMPLE

The system of the present embodiment allows trading in tenors ranging from 0×1 out to 24×27 in USD, DEM, GBP, and JPY. The minimum trade size defined is set as USD 50 million (3 month equivalent notional value).

In the following case, for floor A to see dealable prices from floor B they must allocate sufficient credit to execute one trade in USD for a minimum notional size 50 million.

Trading floor A uses USD as their credit limit currency.

Trading floor A is only trading USD FRAs

Trading floor A has assigned a currency volatility factor to USD of 0.5%.

For floor A to see prices from floor B, it must allocate sufficient credit to floor B to execute one USD Mar 00 (24 months away) for USD 50 mil.

The minimum credit is calculated as follows (the TTS factor is assumed to be the square root of the TTS): minimum available credit=(4,4889)*(0.005)*(50,000,000)=$1,122,225.

Having thus calculated the minimum credit threshold, the Market Access Node then calculates for each potential counterparty whether at least the minimum order size could be dealt by checking against the credit limit available for the Credit Group associated with that counterparty, and transmits a CreditUpdate message to the affected Arbitrator(s) and Market Distributor(s) containing a simple binary indication of whether credit is currently available or not available to each designated potential counterparty in an amount at least equal to the calculated minimum credit threshold established by the credit granting entity associated with that Market Access Node. Provided that the relevant threshold has been met, the Arbitrator(s) and Market Distributor(s) receiving the CreditUpdate message place a "1" in the associated cell of their Pre-Authorisation Matrix. Conversely, if the CreditUpdate message indicates that the available credit is below the relevant threshold, the Arbitrator(s) and Market Distributor(s) receiving the CreditUpdate message place a "0" in the associated cell.

The Pre-Authorisation Matrix is then used in known fashion to pre-screen distributed buy/sell orders so that only "dealable" prices are shown to traders.

Figure 7:
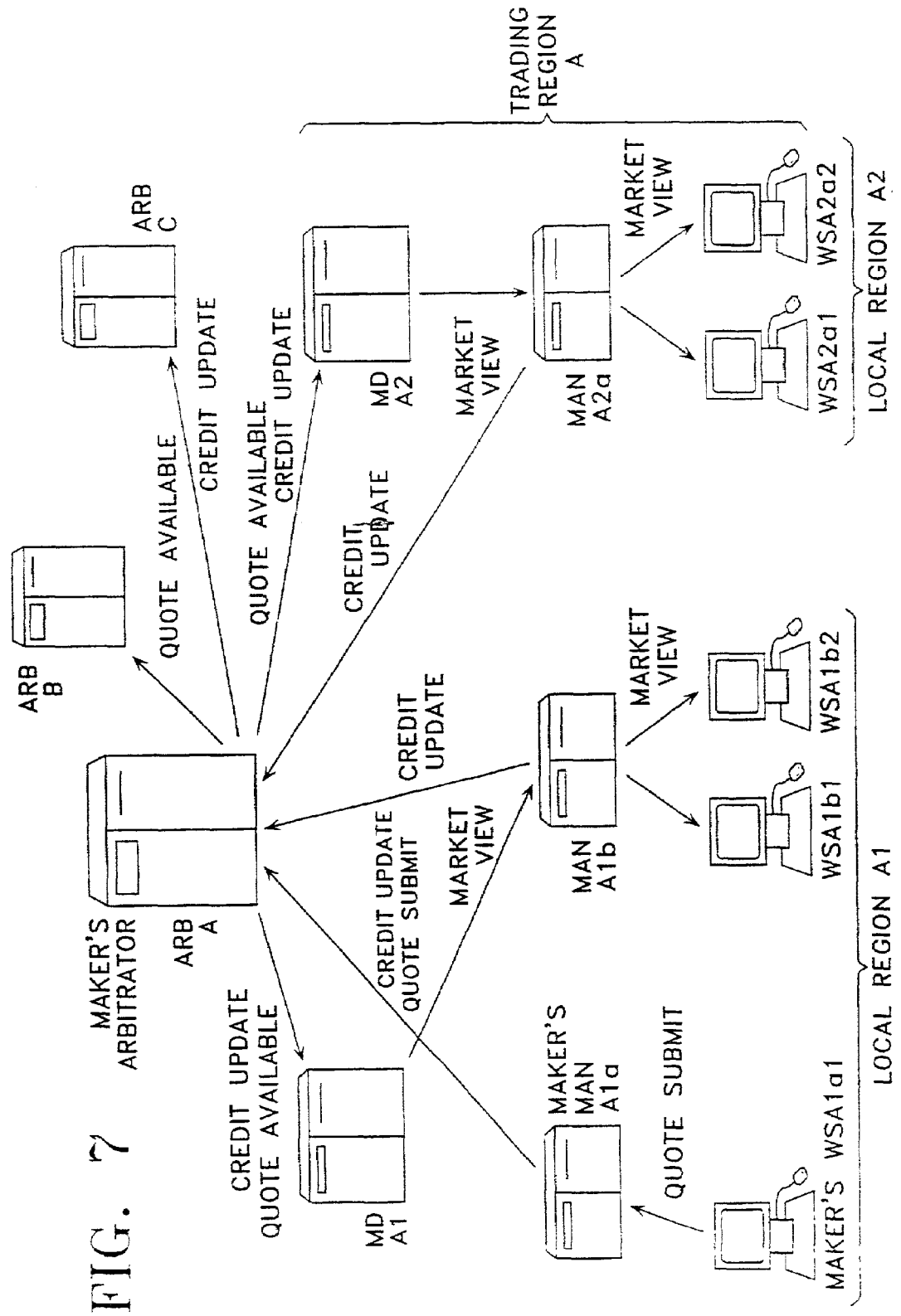
FIG. 7 shows the flow of messages in the communication network which are used to generate and distribute Dealable Price information to each individual trader.

FIG. 7 shows the flow of electronic messages relating to the distribution of customised Dealable price information to each trading floor. As noted previously, although a distributed order matching system with more than one Arbitrator is shown, many aspects of the invention are equally applicable to a more centralized system with only one Arbitrator; alternatively, a single arbitrator could be dedicated to all trades involving a discrete subset of the available financial instruments. The trader at WS A1$a$1 of trading floor A1$a$ generates a Quote submit message to the trading floor's MAN (MAN A1$a$) in the form of a bid, offer, buy or sell. The MAN in turn logs the Quote submit and forwards the Quote submit message to the Maker's Arbitrator Node (ARB A) whose assigned geographical trading region includes the Maker's trading floor A1$a$1. In turn, ARB A updates an ordered list of available bids and an ordered list of available offers for the relevant tenors, each ranked by price and time of receipt (preferably at the Maker's ARB), and containing data fields for indicating the Quantity, and the quantity reserved by the Arbitrator pending completion or failure of a pending deal resulting from a potential match initiated by the Arbitrator and not yet confirmed by the Maker and Taker. A corresponding Quote available message is then transmitted from the Maker's ARB A to the MD's in its trading region MD A1, MD A2, and to the other ARB's for eventual distribution to the MD's and MAN's of other trading regions.

Each MAN (for example, MAN A1$b$) also transmits a Credit update message to its associated ARB (ARB A) whenever the credit status for any of its potential counterparties (for example. A1$a$ or A2$a$) changes from CreditAvailable to CreditNotAvailable or vice versa, which the ARB then retransmits to its affected MD's and to the other affected ARB's.

The MD's then use the information in the received Credit update messages to maintain the Pre-Authorisation Matrix such as that shown in FIG. 6. The rows and columns of the Pre-Authorisation Matrix PM are associated with the various trading floors A1$a$, A1$b$, A2$a$, etc (including any floors in other trading regions) and for each ordered pair of trading floors $\{TF_i, TF_j\}$ contains an indication as to whether $TF_i$ has extended any credit to $Tf_j$. In the depicted example, credit exists on a bilateral basis between TFA1 and TFA2, no credit exists between TFA1 and TFB1, and credit has been extended unilaterally from TFA2 and TFB1, but not vice versa (as indicated by the "1" at the intersection of row TFB1 with column TFA2 and the "0" at the corresponding intersection of column TFB1 with row TFA2). From the main diagonal of the Pre-Authorisation Matrix it can be seen that only TFA2 permits its own traders to trade between themselves, as indicated by the "1" at the intersection of row TFA2 with column TFA2. Preferably, each MD only maintains a partial Pre-Authorisation Matrix containing data only regarding credit extended from or to its associated MAN's to the other potential counterparties (MAN's) in the system. Thus, as indicated in FIG. 6 by cross hatching, some of the Pre-Authorisation Matrix entries may be blank.

The MD's use the Quote available messages to update their own ordered lists of available bids and offers; these ordered lists and the above-described Pre-Authorisation Matrix are then used by the MD to calculate separate Dealable prices for each trading floor which are transmitted as MarketView messages to the affected MAN's.

To update the Pre-Authorisation Matrix, each MAN transmits a Pre-Authorisation Matrix update message to an Arbitrator which then stores this in a Pre-Authorisation Matrix used as part of deal matching. The Arbitrator also distributes the update message to other Market Distributors where Pre-Authorisation Matrices are stored for pre-screening prices.

CreditUpdate messages are sent in any situation in which the Pre-Authorisation Matrix should be changed, such as:
(i) If the credit available itself has changed because of completed deals.
(ii) if the TFA adjusts the credit limit.
(iii) If the TFA adjusts any of the parameters from which the credit threshold is derived.
(iv) All of the trading floor's credit limits are reset.

In addition, the DealStatus message sent at the end of each deal includes an indication of the Pre-Authorisation Matrix status for the counterparty with which the deal was completed. This is to ensure that a rematch is not attempted if the credit status has changed.

Deal Matching Process

For completeness, the deal matching process is described. A match is not allowed to proceed if the credit utilisation as calculated exceeds the available credit set by the TFA. Thus, even though prescreened for credit, a further check of bids, offers, buy and sell order credit compatibility is done as part of deal matching.

Orders that are compatible are matched by the dealing system. Newly submitted bid and buy orders are matched against outstanding offer orders. Newly submitted sell and offer orders are matched against outstanding bid orders.

A new bid or buy order is compatible to an existing offer or sell order if all of the following conditions are true:
 The orders are for the same tenor.
 The trade floors of the orders are credit compatible with respect to this order—or— the trade floors of the two orders are identical.
 The price of the bid or buy order is greater than or equal to the offer or sell order.
 The amounts of both orders are greater than or equal to the 3-month-equivalent of the system defined minimum notional amount parameter.

Figure 8:
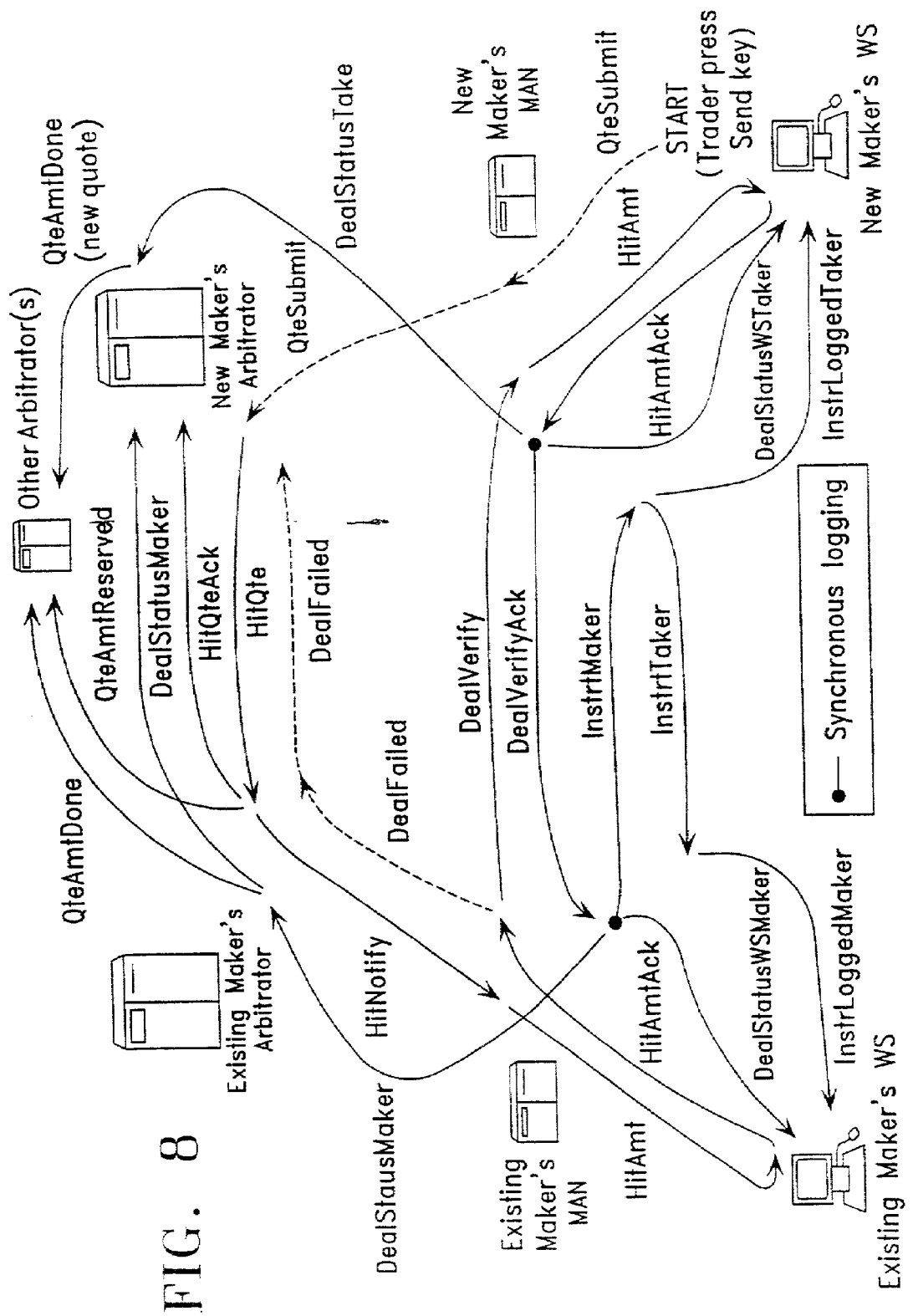
FIG. 8 is a diagram of the message flow in deal matching.

The process by which all orders are matched is called the "automatch" process as shown in FIG. 8. Any order submitted into the system is first matched against all existing bids and offers at the maker's Arbitrator. The existing orders are considered in price/time order in search of compatible orders. If a compatible order is found, the two orders are "matched" and a deal is initiated for the amount equal to the minimum of the two order amounts. The process continues until the remaining three-month-equivalent amount of the submitted order becomes less than the value of the minimum notional amount parameter, or until there are no compatible orders.

If the remaining three-month equivalent amount of the submitted order is less than the value of the minimum notional amount parameter, the submitting workstation is informed accordingly and the order is cancelled.

When a newly submitted order is not completely filled during the automatch process, the order becomes either a bid or offer in the dealing system's collection of outstanding orders. The amount of the outstanding order is equal to the amount that was not matched during the automatch process.

In order to complete a deal initiated during the automatch process, the dealing system must then verify in known fashion that both of the matched orders have not been removed by the trader and that there remains sufficient credit available to complete at least a system defined minimum deal size.

The final deal amount is lesser of the initial deal amount, the available credit from the first floor (or other associated first credit granting entity) to the second floor (or other associated first Credit Group), and the available credit from the second floor (or other associated second credit granting entity) to the second floor (or other associated second Credit Group). If any of these amounts is less than the 3-month-equivalent of the minimum notional amount parameter, then the matching process for this deal fails.

When an order is submitted and one or more deals is initiated, the price closest to the newly submitted order, tenor identification, and the combined amounts of all deals must be displayed on all trader workstations that have requested to view information of this type.

For example, a trader submits a USD Sep 97 sell order for $50 million at 5.6725 while the best dealable bid price is 5.6750. The trader's order is immediately matched for the following deals:
 10 @5.6750 CITL
 10 @5.6750 BBIL
 10 @5.6750 ABNL
 10 @5.6725 BOAL An exemplary EBS deals notification includes the following information:
 Current Time (GMT): 12:34
 Tenor Identification: Sep97
 Price: 5.6725

Orders may be matched between dealers at the same trading floor, therefore the dealing system provides capabilities for intra-floor dealing. This feature is not optional. When an order is submitted into the system, no special priority is given to try to match the order with outstanding orders from the same trading floor. All deals—regardless of intra-floor dealing—are matched in price/time priority.

The prices obtained by any match will be the best dealable price, if this is available after credit screening, followed by the best regular price once all the amount at the best dealable price is matched. The reason for this is because of the way in which quotes are ordered in the system. The quotes of the parties without sufficient credit to pass credit screening are removed from the list of current quotes, and the best dealable price of the remaining quotes is selected. All the quotes at this price are then aggregated and displayed. If the best dealable price is greater than 50 M USD then this is also shown as the best regular price.

Deal Completion Process

The deal completion procedure is also shown in FIG. 8, and is described for completeness only and is not central to the aspect of credit screening.

After a deal is initiated it is considered pending until the floors notify their Arbitrators of the deal's status or the deal times out. The maker floor notifies its Arbitrator with the DealStatusMaker message, the taker with the DealStatusTaker message. The taker Arbitrator is made aware of the maker deal status when the Market Processor sends it a copy. If the deal did not succeed (perhaps due to insufficient credit) the floors send the DealFailed message.

The deal status reflects whether the deal was actually performed and what the amount of the deal was. The amount could be different from the initial amount of the deal due to credit restrictions. The Market processor records the deal information. If the deal was executed for an amount smaller than the original amount, the remaining amount may be available for another match.

The Dealt amount will be increased by the final amount of the deal done. The Pending amount will be reduced by the original amount of the deal.

If the quote involved in the deal is local the Market Processor notifies other Arbitrators of the amount done with the QteAmtDone message. The Arbitrator that hit the quote is not notified. This is done by QuoteAdjust function. It also sends MktQteAmtUnreserved message to the Market Distributors. This function is also called when the Arbitrator times out on DealStatus messages from either the maker or the taker Market Access Node.

Any newly available amount in the quote is activated. The QuoteActivateAmt function uses the quote's currently available amount and the quote's price to update the dealable aggregate of the submitter of the quote and those of the submitter's trading partners.

A bid and a sell request are described as compatible if amongst other factors respective trading floors have credit with each other (as evidenced by the yes/no Pre-Authorisation Matrix) and the price of the bid is greater than or equal to the price of the sell request.

A deal may involve one or two Arbitrators. An Arbitrator not participating in a deal will be called passive (with respect to that deal).

An Arbitrator frequently needs to broadcast information related to a specific deal to all passive Arbitrators and to all local Market Distributors. For convenience, we will term this group the passive components (in relation to a given deal and Arbitrator).

1. The new maker's Workstation sends a QteSubmit message to its Market Access Node. The MAN sends the QteSubmit message to its Arbitrator.
2. The new maker's Arbitrator detects the opportunity to automatch and selects a compatible existing quote.
3. If the existing quote is not from a local maker, the new maker's Arbitrator sends the HitQte message to the existing maker's Arbitrator.
4. The existing maker's Arbitrator receives the HitQte message. It responds immediately with a HitQteAck message specifying the deal ID and the actual amount of the quote allocated to the request (this amount could be zero or less than the requested amount if the quote was interrupted or hit by another new maker). If the allocated amount is non-zero, the existing maker's Arbitrator creates a new entry in its Pending Deals list, sends a HitNotify message to the existing maker's MAN, and broadcasts the QteAmtReserved message to all passive Arbitrators and the MktAmtReserved message to the Market Distributors in its region.

The existing maker's MAN checks for sufficient credit with the counterparty. If the credit limit is not sufficient to process the entire deal amount, the MAN reduces the deal amount to the limit amount. If no credit is available at all, the deal is aborted at this step and the DealFailed message is sent to the Arbitrator indicating the reason of the failure. (The existing maker's Arbitrator notifies the new maker's Arbitrator and the affected Market Distributors by sending CreditUpdate message. It then forwards the DealFailed message to the new maker's Arbitrator and broadcasts the QteAmtDone message to all passive Arbitrators and the MktQteAmtUnreserved message to local Market Distributors).

6. The existing maker's MAN reduces the credit limit for the counterparty by the amount of the pending deal.
7. The existing maker's MAN sends the HitAmount message to the maker's Workstation. If the trader has not interrupted the quote, he is notified that a deal is pending and his ability to interrupt the amount of the quote being hit is removed. In either case, the Workstation responds with the HitAmountAck message to the existing maker's MAN. If the quote has been interrupted, the MAN cancels the deal, restores the existing maker's credit limit.
8. The existing maker's MAN logs the pending deal.
9. The existing maker's MAN sends the DealVerify message to the new maker's MAN.
10. The new maker's man receives the DealVerify message and checks the existing maker's credit limit. If the credit limit is not sufficient to process the entire deal amount, the MAN reduces the deal amount to the limit amount. (If no credit is available at all, the deal is cancelled and the new maker's MAN sends only messages DealStatusTaker and DealVerifyAck described below with the deal amount set to zero).
11. The new maker's MAN reduces the existing maker's credit limit by the amount of the deal.
12. The new maker's MAN logs the deal.
13. The new maker's MAN sends the DealStatusTaker message to its Arbitrator, including any credit updates. (If the credit relationship between maker and taker has changed the Arbitrator updates its Pre-Authorisation Matrix and notifies the other Arbitrators and the taker's Market Distributor via CreditUpdate and MktCreditUpdate messages, respectively).
14. The new maker's MAN sends the DealVerifyAck message to the existing maker's MAN and the DealDoneWS message to the taker's Workstation. The messages specify the final deal amount.
15. The existing maker's MAN receives the DealVerifyAck message if the deal amount has been reduced on the new maker's side, the maker's MAN readjusts the new maker's credit limit. The existing maker's MAN logs the deal.
16. The existing maker's MAN sends the DealStatusMaker message to the maker's Arbitrator with any credit updates.
17. The existing maker's Arbitrator receives the DealStatusMaker message and forwards it to the new maker's Arbitrator. If the DealStatusMaker message indicates that the credit relationship between existing maker and new maker has changed, the existing maker's Arbitrator updates its Pre-Authorisation Matrix and notifies the other Arbitrators and local Market Distributors via CreditUpdate and MktCreditUpdate messages, respectively.
18. The existing maker's Arbitrator notifies passive Arbitrators about the deal by sending the QteAmtDone messages. If the final deal amount is different the amount originally requested from the maker's MAN, the existing maker's Arbitrator also broadcasts the QteAmtUnreserved message to the local Market Distributors.
19. The existing maker's MAN sends the DealDoneWS message to the existing maker's Workstation.
20. The existing maker's MAN sends the InstructionsMaker message to the new maker's MAN.
21. The new maker's MAN receives the InstructionsMaker message and sends the InstructionsTaker message to the maker's MAN and the InstrLoggedTaker message to the new maker's Workstation.

22. The existing maker's MAN receives the InstructionsTaker message and sends the InstrLoggedMaker message to the existing maker's Workstation.

Settlement Terms Mismatch

In addition to verification that sufficient credit is available, the settlement terms are also checked bilaterally to ensure no mis-match occurs. Possible settlement terms are FRABBA, ISDA, "either" (which will match either FRABBA or ISDA), and "none" (which results in an automatic mis-match).

As a trading floor parameter, each trading floor must be able to maintain a list of counterparties that have ISDA agreements with that trading floor. Deals between floors which have mutually designated each other as having ISDA (or both ISDA and FRABBA) agreements will have the text "ISDA" printed on the two deal tickets in the "Settlement Terms" field. Deals between floors whose FRABBA/ISDA designations do not match will have the text "mismatch" printed on the deal tickets in this field. All other deals will result in deal tickets with the text "FRABBA" printed in the "Settlement Terms" field.

In the event of a mis-match between the floors, the deal on which the mis-match occurs is completed, but each trading floor disallowed from further trading with the other until the mis-match is resolved.

Other Price Screening

We have appreciated that prices could be screened using the Pre-Authorisation Matrix shown in FIG. 6 for other criteria. In particular the Pre-Authorisation Matrix could be used to designate whether the settlement terms of two parties match. Thus, by using the Pre-Authorisation Matrix in the manner described, prices would only be shown if there is an agreement of settlement terms between the two parties. Other Pre-Authorisation Matrices are also possible, and may be used in conjunction with the embodiment of the invention described.

Credit Maintenance

Figure 9:
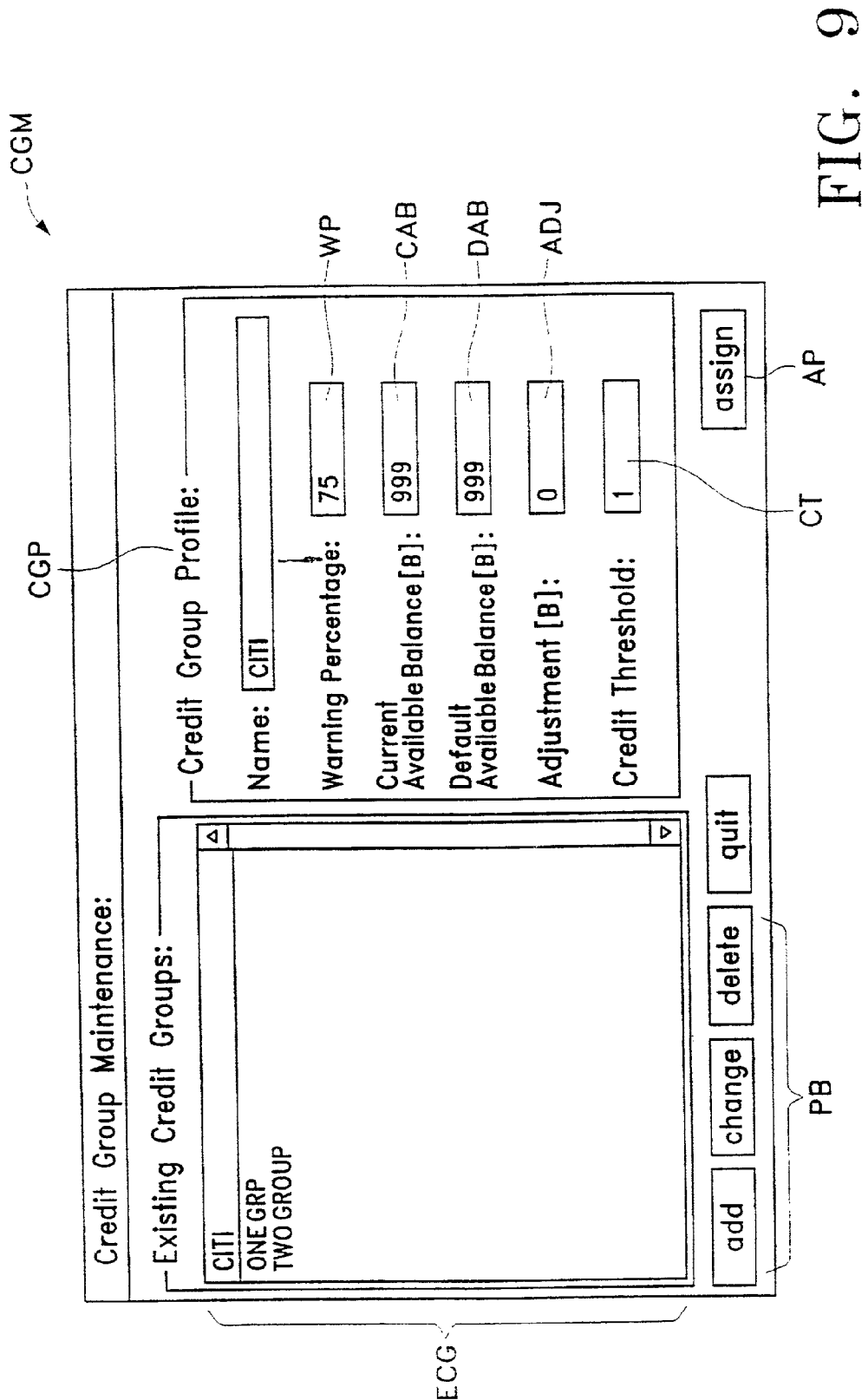
FIG. 9 shows a Trading Floor Administrator's Credit Group Maintenance screen.

The Credit Group Maintenance screen shown in FIG. 9 includes Existing Credit Groups showing the credit groups already created and has pushbuttons to create, delete or modify the groups. When an Existing Credit Group is highlighted (or a new Credit Group is being created), the Credit Group Profile shows the Credit Threshold calculated as described above as well as the Current Available Balance for the selected group, and permits the Trading Floor Administrator ("TFA") to modify the Warning Percentage, Default Available Balance (which will become the new Available Balance whenever the TFA (or the system) resets all the credit limits), and/or to make a positive or negative Adjustment to the displayed Current Available Balance. An Assign Pushbutton allows the TFA to modify the assignment of trading floors to the selected groups.

The invention claimed is:

1. A computerized trading system for trading Forward Rate Agreements (FRAs) between traders associated with a plurality of credit granting entities, the system comprising:
   a quote distribution system which contains information received from a plurality of credit granting entities indicating whether that credit granting entity is extending unilateral credit to other credit granting entities;
   at least some of the credit granting entities having at least one maker screen and at least one taker screen associated therewith:
   (a) the maker screen being configured to permit a trader to send maker price quotation messages to the quote distribution system, the maker price quotation message indicating a bid price at which the trader is willing to sell one or more of the FRAs and/or an offer price at which the trader is willing to buy one or more of the FRAs; and
   (b) the taker screen being configured to permit a trader to view and accept dealable price quotation messages received from the quote distribution system; and
   the quote distribution system:
   (a) determining which pairs of credit granting entities are credit bearing counter-parties which extend bilateral credit to one another as a function of the unilateral credit information, said determination being made as a function of at least two respective assigned risk factors including a volatility factor for each of the FRAs, the at least two of the assigned risk factors being different from one another; and
   (b) sending dealable price quotation messages to each credit granting entity indicating the best available bid and/or offer that originates from one or more credit bearing counter-parties of that credit granting entity.

2. The computerized trading system of claim 1, wherein at least one of the FRAs is associated with a time to settlement and the determination is made as a function of the time to settlement.

3. A method of trading a plurality of Forward Rate Agreements (FRAs) on an electronic trading system comprising one or more computers, the method comprising:
   one or more computers of the electronic trading system receiving maker price quotation messages from a trader associated with one or more credit granting entities, the maker price quotation messages indicating a bid price at which the trader is willing to sell one or more of the FRAs and/or an offer price at which the trader is willing to buy one or more of the FRAs; and
   one or more computers of the electronic trading system determining which pairs of credit granting entities are credit bearing counter-parties which extend bilateral credit to one another as a function of risk factors including a volatility factor which vary for at least two FRAs and sending dealable price quotation messages to the credit granting entities as a function thereof, each credit granting entity being sent dealable price quotation messages indicating bids and/or offers that originate from one or more credit bearing counter-parties of that credit granting entity.

4. The method of claim 3, wherein at least one of the FRAs is associated with a time to settlement and the determination is made as a function of the time to settlement.

5. The method of claim 3, further comprising permitting traders at at least some of the credit granting entities to accept dealable price quotation messages received by the credit granting entity with which it is associated.

6. A computerized trading system for trading a plurality of Forward Rate Agreements (FRAs) between traders associated with a plurality of credit granting entities, the system comprising:
   a quote distribution system, which contains information received from a plurality of credit granting entities, which determines, as a function of at least two assigned risk factors including a volatility factor for each of the FRAs, the at least two of the assigned risk factors being different from one another, which pairs of the plurality of credit granting entities have bilateral credit with each other, such pairs of credit granting entities being credit bearing counter-parties, the quote distribution system also sending information to the credit granting entities as a function thereof;

each of the credit granting entities being associated with at least one;

(a) maker screen configured to permit a trader to send maker price quotation messages to the quote distribution system, the price quotation message indicating a bid price at which the trader is willing to sell one or more FRAs and/or an offer price at which the trader is willing to buy one or more FRAs; and (b) taker screen configured to permit a trader to view and accept dealable price quotation messages indicating bids and/or offers that originate from one or more credit bearing counter-parties.

7. The computerized trading system of claim 6, wherein at least one of the FRAs is associated with a time to settlement and the determination is made as a function of the time of settlement.

8. A computerized trading system for trading a plurality of Forward Rate Agreements (FRAs) between traders at a plurality of credit granting entities, the system comprising:

a quote distribution system which contains information received from a plurality credit granting entities, at least a plurality of the credit granting entities including at least one: (a) maker screen configured to permit a trader associated with the credit granting entity to send maker price quotation messages to the quote distribution system, the price quotation message indicating a bid price at which the trader is willing to sell one or more of the FRAs and/or an offer price at which the trader is willing to buy one or more of the FRAs; and (b) taker screen configured to permit a trader to view dealable price quotation messages received from the quote distribution system and accept a dealable bid and/or offer displayed on the taker screen, the quote distribution system determining which pairs of credit granting entities have bilateral credit with one another and sending information to the credit granting entities as a function thereof, the determination being made as a function of at least two assigned risk factors including a volatility factor for each of the FRAs, the at least two of the assigned risk factors being different from one another.

9. The computerized trading system of claim 8, wherein at least one of the FRAs is associated with a time to settlement and the determination is made as a function of the time to settlement.

10. The computerized trading system of claim 8, wherein each of the credit granting entities is configured to display dealable price quotation messages on its taker trading screens which indicate which bids and/or offers it can accept as a function of whether or not the bid and/or offer originates from one or more credit granting entities with which it has bilateral credit as determined by the quote distribution system.

11. A method of trading, on an electronic trading system comprising one or more computers, a plurality of Forward Rate Agreements (FRAs) between traders at a plurality of credit bearing entities, some of the credit bearing entities being credit bearing counter-parties which extend bilateral credit to one another, the counter parties extending bilateral credit to one another as a function of risk factors including a volatility factor which vary for at least two FRAs, at least one of the credit bearing entities being associated with one or more trading screens configured to permit a trader to trade the FRAs, the trading screen being configured to display bids and/or offers made by traders at other credit bearing entities and to permit a trader to accept certain ones of the bids and/or offers, the trading screens having a best dealable price area and a best market price area, the method comprising:

one or more computers of the electronic trading system causing a trading screen to display, in the best market price area, only the best market bid and/or offer made by one or more traders at any of the credit bearing entities irrespective of whether or not the bid and/or offer originated from credit bearing entity which is a credit bearing counter-party to the credit bearing entity with which the trader screen is associated; and one or more computers of the electronic trading system causing the trading screen to simultaneously display in the best dealable price area only the best dealable bid and/or offer which a trader using the trading screen is permitted to accept.

12. The method of claim 11, wherein at least one of the FRAs is associated with a time to settlement and the counter-parties extending bilateral credit to one another also as a function of the time to settlement.

13. The method of claim 11, wherein the best dealable bid and/or offer are the best bid and/or offer made by one or more credit bearing counter-parties of the credit bearing entity with which the trading screen is associated.

14. The method of claim 11, wherein the best dealable bid and/or offer for a preset quantity of FRAs are caused by the one or more computers to be displayed in the best dealable price area.

15. The method of claim 11, wherein the best dealable bid and/or offer of any quantity are caused by the one or more computers to be displayed in the best dealable price area.

16. The method of claim 11, further comprising one or more computers of the electronic trading system permitting the trader using the trading screen to accept the best dealable bid and/or offer displayed in the best dealable price area but preventing that trader from accepting the best market bid and/or offer displayed in the best market price area.

17. A method for trading a plurality of Forward Rate Agreements (FRAs) on an electronic trading system comprising one or more computers, the method comprising:

one or more computers of the electronic trading system determining which pairs of a plurality of credit granting entities are credit bearing counter-parties which extend bilateral credit to one another without any of the credit granting entities knowing which of the other credit granting entities are currently extending credit to it, the determination being made as a function of at least two assigned risk factors including a volatility factor for each of the FRAs, the at least two of the assigned risk factors being different from one another;

one or more computers of the electronic trading system receiving maker price quotation messages from individual credit granting entities, each maker price quotation message indicating a bid and/or offer price at which a maker is willing to buy and/or sell one or more of said FRAs to other anonymous traders having bilateral credit with the credit granting entity with which the maker is associated; and one or more computers of the electronic trading system generating a display for each credit granting entity of the best bid and/or offer that originates from one or more credit bearing counter-parties of that credit granting entity and permitting a trader to accept such best bid and/or offer.

18. The method of claim 17, wherein at least one of the FRAs is associated with a time to settlement and the determination is made as a function of the time to settlement.

19. A method for trading a plurality of Forward Rate Agreements (FRAs) on an electronic trading system comprising one or more computers, said method comprising:
- one or more computers of the electronic trading system determining which pairs of a plurality of credit granting entities are credit bearing counter-parties who have granted each other sufficient credit to trade the FRAs with each other, the determination being made as a function of at least two assigned risk factors including a volatility factor for each of the FRAs, the at least two of the assigned risk factors being different from one another; and
- permitting credit bearing counter-parties to trade a plurality of the types of financial instruments with one another by one or more computers of the electronic trading system generating a display, for each credit bearing counter-party, of information concerning bids and/or offers from its credit bearing counter-parties.

20. The method of claim 19, wherein at least one of the FRAs is associated with a time to settlement and the determination is made as a function of the time to settlement.

21. The method of claim 19, wherein the assigned risk factors for at least one of the credit granting entities is different than the assigned risk factors for at least one other of the credit granting entities.

22. The method of claim 21, wherein, for each credit granting entity, a separate risk factor is assigned to each of the FRAs, the separate risk factor being different for at least two of the FRAs.

23. The method of claim 19, wherein, for each credit granting entity, a separate risk factor is assigned to each of the FRAs, the separate risk factor being different for at least two of the FRAs.

24. The method of claim 19, wherein each credit granting entity has a respective set of assigned risk factors assigned to the respective FRAs, at least two of the sets of assigned risk factors being different from each other.

25. The method of claim 24, wherein each credit granting entity assigns its own set of assigned risk factors.

26. The method of claim 25, wherein the determination of which pairs of credit granting entities are credit bearing counter-parties is made as a function of a calculated credit utilization for each of the FRAs, each credit utilization being calculated for each respective credit granting entity as a function of the risk factors assigned to the FRAs by the respective credit granting entity.

27. The method of claim 19, wherein the determination of which pairs of credit granting entities are credit bearing counter-parties is made as a function of unilateral credit granting messages generated by each credit granting entity and indicating which of the other credit granting entities it is granting unilateral credit to.

28. The method of claim 27, wherein each credit granting entity determines whether or not it will grant unilateral credit to the other credit granting entities as a function of a respective set of said risk factors which said credit granting entity assigns for each of the FRAs.

29. A computerized trading system for trading a plurality of Forward Rate Agreements (FRAs) between traders associated with a plurality of credit granting entities, the system comprising:
- a quote distribution system which contains information received from a plurality of credit granting entities indicating whether that credit granting entity is extending unilateral credit to other credit granting entities;
- at least some of the credit granting entities having at least one maker screen and at least one taker screen associated therewith;
- (a) the maker screen being configured to permit a trader to send maker price quotation messages to the quote distribution system, the maker price quotation message indicating a bid price at which the trader is willing to sell one or more of the FRAs and/or an offer price at which the trader is willing to buy one or more of the FRAs; and
- (b) the taker screen being configured to permit a trader to view and accept dealable price quotation messages received from the quote distribution system; and the quote distribution system:
- (a) determining which pairs of credit granting entities are credit bearing counter-parties which extend bilateral credit to one another as a function of the unilateral credit information, said determination being made as a function of at least a respective assigned risk factor for each of the FRAs, the risk factors including a time to settlement, a volatility factor representing a measure of volatility of interest rates in the currency of the FRA and the time between settlement and maturity of the FRA; and
- (b) sending dealable price quotation messages to each credit granting entity indicating the best available bid and/or offer that originates from one or more credit bearing counter-parties of that credit granting entity.

* * * * *